(12) United States Patent
Campbell et al.

(10) Patent No.: US 10,704,584 B2
(45) Date of Patent: Jul. 7, 2020

(54) PROCESS FOR JOINING FIBER COMPOSITE MATERIALS USING SELF-PIERCING RIVETS

(71) Applicant: Ford Global Technologies, LLC, Dearborn, MI (US)

(72) Inventors: Aindrea McKelvey Campbell, Beverly Hills, MI (US); Garret Sankey Huff, Ann Arbor, MI (US); Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 420 days.

(21) Appl. No.: 15/658,029

(22) Filed: Jul. 24, 2017

(65) Prior Publication Data

US 2017/0321738 A1 Nov. 9, 2017

Related U.S. Application Data

(62) Division of application No. 14/249,579, filed on Apr. 10, 2014, now abandoned.

(51) Int. Cl.
*F16B 19/08* (2006.01)
*B21J 15/02* (2006.01)
(Continued)

(52) U.S. Cl.
CPC ........... *F16B 19/086* (2013.01); *B21J 15/025* (2013.01); *B21J 15/08* (2013.01); *B21J 15/147* (2013.01);
(Continued)

(58) Field of Classification Search
CPC ...... F16B 19/086; F16B 5/04; B32B 38/0036; B32B 2605/00; B32B 2038/0096; B32B 2037/0092; B29C 66/91945; B29C 65/02; B29C 66/919; B29C 66/8322; B29C 66/81431; B29C 66/7422; B29C 66/742; B29C 66/721; B29C 66/41; B29C 66/21; B29C 66/1122; B29C 66/0242; B29C 65/72; B29C 65/562; B29C 66/73117; B29C 66/71; B29C 66/81433; B29C 66/74283; B29C 66/7394; B29C 66/7392; B29C 66/7212; B29C 65/564; B29C 65/36; B29C 65/14; B29C 65/10; B21J 15/147; B21J 15/08; B21J 15/025; B29K 2309/08; B29K 2307/04; B29K 2077/00;
(Continued)

(56) References Cited

U.S. PATENT DOCUMENTS 6,405,420 B1 6/2002 Donhauser et al.
6,732,420 B2 5/2004 Wang et al.
(Continued)

*Primary Examiner* — Sarang Afzali
*Assistant Examiner* — Darrell C Ford
(74) *Attorney, Agent, or Firm* — Vincent Mastrogiacomo; Brooks Kushman P.C.

(57) ABSTRACT

A process for joining fiber composite materials using self-piercing rivets. The process includes contacting first and second panels. The second panel is a fiber composite material. The process further includes elevating a temperature of only a fastening portion of the second panel. The process also includes placing the first and second panels on a die and joining the first and second panels with one or more rivets while the fastening portion is at an elevated temperature.

20 Claims, 5 Drawing Sheets

(51) Int. Cl.
| | |
|---|---|
| B29C 65/56 | (2006.01) |
| B29C 65/72 | (2006.01) |
| B29C 65/00 | (2006.01) |
| B32B 38/00 | (2006.01) |
| F16B 5/04 | (2006.01) |
| B21J 15/08 | (2006.01) |
| B21J 15/14 | (2006.01) |
| B29C 65/02 | (2006.01) |
| B29C 65/10 | (2006.01) |
| B29C 65/14 | (2006.01) |
| B29C 65/36 | (2006.01) |
| B32B 37/00 | (2006.01) |
| B29K 63/00 | (2006.01) |
| B29K 77/00 | (2006.01) |
| B29K 307/04 | (2006.01) |
| B29K 309/08 | (2006.01) |

(52) U.S. Cl.
CPC ............ *B29C 65/02* (2013.01); *B29C 65/562* (2013.01); *B29C 65/72* (2013.01); *B29C 66/0242* (2013.01); *B29C 66/1122* (2013.01); *B29C 66/21* (2013.01); *B29C 66/41* (2013.01); *B29C 66/721* (2013.01); *B29C 66/742* (2013.01); *B29C 66/7422* (2013.01); *B29C 66/81431* (2013.01); *B29C 66/8322* (2013.01); *B29C 66/919* (2013.01); *B29C 66/91945* (2013.01); *B32B 38/0036* (2013.01); *F16B 5/04* (2013.01); *B29C 65/10* (2013.01); *B29C 65/14* (2013.01); *B29C 65/36* (2013.01); *B29C 65/564* (2013.01); *B29C 66/71* (2013.01); *B29C 66/7212* (2013.01); *B29C 66/7392* (2013.01); *B29C 66/7394* (2013.01); *B29C 66/73117* (2013.01); *B29C 66/74283* (2013.01); *B29C 66/81433* (2013.01); *B29K 2063/00* (2013.01); *B29K 2077/00* (2013.01); *B29K 2307/04* (2013.01); *B29K 2309/08* (2013.01); *B32B 2037/0092* (2013.01); *B32B 2038/0096* (2013.01); *B32B 2605/00* (2013.01)

(58) Field of Classification Search
CPC ........... B29K 2063/00; Y10T 29/49947; Y10T 29/49954; Y10T 29/49956; Y10T 29/49957; Y10T 29/49826; Y10T 29/49863; Y10T 29/49865
USPC ...... 29/525.01, 525.05, 525.06, 525.07, 428, 29/446, 447
See application file for complete search history.

(56) References Cited

U.S. PATENT DOCUMENTS

| | | | |
|---|---|---|---|
| 6,921,444 B2 * | 7/2005 | Joaquin | B21D 26/023 |
| | | | 148/570 |
| 6,962,469 B2 | 11/2005 | Wang et al. | |
| 7,628,573 B2 | 12/2009 | Philipskotter et al. | |
| 8,070,406 B2 | 12/2011 | Trinick | |
| 8,087,149 B2 | 1/2012 | Wang et al. | |
| 8,234,770 B2 | 8/2012 | Durandet et al. | |
| 8,250,728 B2 | 8/2012 | Stevenson et al. | |
| 8,328,484 B2 | 12/2012 | Trinick | |
| 2004/0068854 A1 | 4/2004 | Kato et al. | |
| 2004/0134573 A1 * | 7/2004 | Joaquin | B21D 26/023 |
| | | | 148/639 |
| 2010/0083481 A1 * | 4/2010 | Luo | B21J 15/025 |
| | | | 29/432 |
| 2010/0232906 A1 | 9/2010 | Singh et al. | |
| 2012/0090158 A1 | 4/2012 | Trinick | |
| 2012/0180305 A1 | 7/2012 | Bartig | |
| 2013/0094924 A1 | 4/2013 | Lee et al. | |
| 2013/0248083 A1 | 9/2013 | Takahashi et al. | |
| 2013/0316148 A1 * | 11/2013 | Gunnink | B32B 15/08 |
| | | | 428/172 |
| 2014/0290064 A1 * | 10/2014 | Smeyers | B21J 15/025 |
| | | | 29/897.2 |
| 2016/0347377 A1 * | 12/2016 | Minei | B29C 65/56 |
| 2018/0094660 A1 * | 4/2018 | Mayer | B29C 65/645 |
| 2019/0338797 A1 * | 11/2019 | Germann | F16B 17/00 |

* cited by examiner

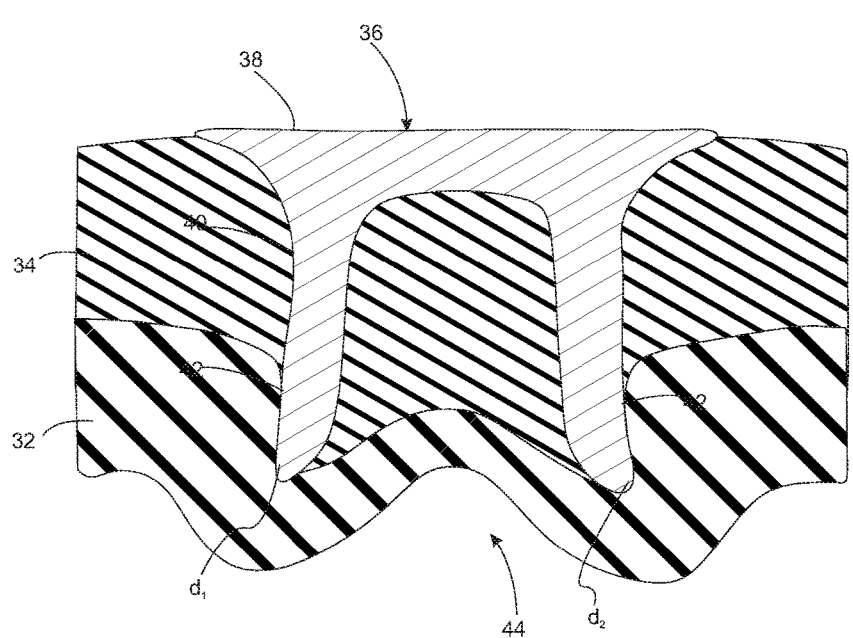
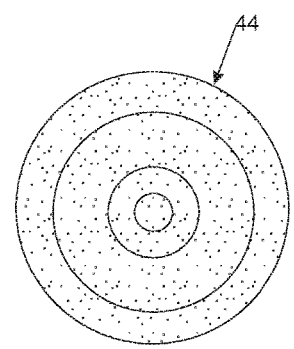
FIG. 3A
FIG. 3B

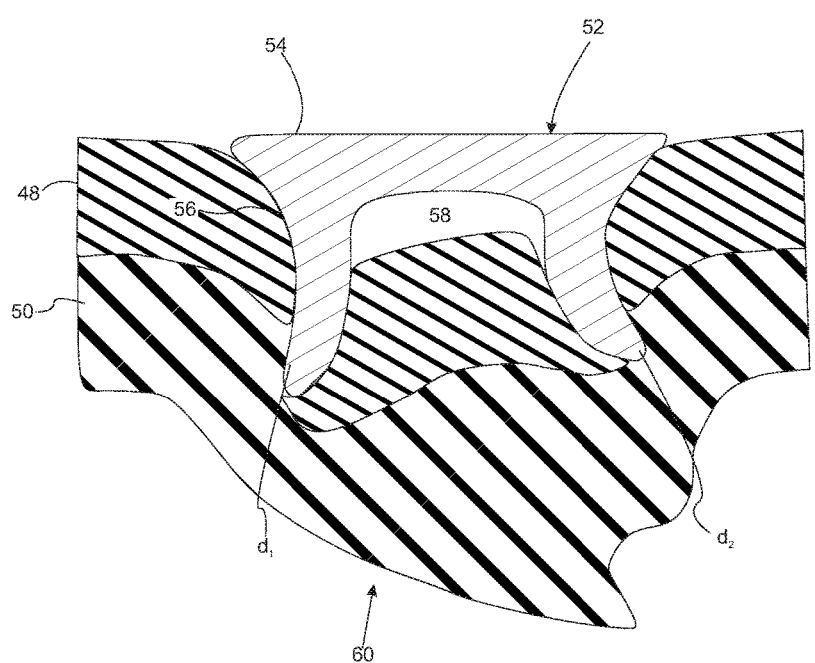
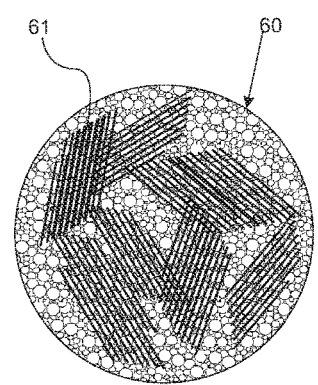
FIG. 4B
FIG. 4A

PROCESS FOR JOINING FIBER COMPOSITE MATERIALS USING SELF-PIERCING RIVETS

CROSS-REFERENCE TO RELATED APPLICATIONS

This application is a division of U.S. application Ser. No. 14/249,579 filed Apr. 10, 2014, now abandoned, the disclosure of which is hereby incorporated in its entirety by reference herein.

TECHNICAL FIELD

The present disclosure relates to a process for joining fiber composite materials, such as carbon fiber composite panels, using self-piercing riveting.

BACKGROUND

Composite materials, such as composite material panels, are used to manufacture structural and body panels for vehicles and other products. The composite materials panels are typically made of one or more polymeric resins reinforced with a material, such as, but not limited to, carbon fibers, glass fibers and natural fibers. Composite material panels are typically fabricated of strong, light-weight materials. In certain applications, composite material panels are joined to panels made of aluminum, steel or other composite materials. Fasteners, such as, but not limited to, clinch joints or rivets, may be used to join the dissimilar panels together.

SUMMARY

According to one embodiment, a process for joining fiber composite materials using self-piercing rivets is disclosed. The process includes contacting first and second panels. The second panel is a fiber composite material. The process further includes elevating a temperature of only a fastening portion of the second panel. The process also includes placing the first and second panels on a die and joining the first and second panels with one or more rivets while the fastening portion is at an elevated temperature.

In another embodiment, a process for joining fiber composite materials using self-piercing rivets is disclosed. The process includes contacting first and second panels. The second panel is a fiber composite material. The process includes elevating a temperature of only a fastening portion of the second panel. The process further includes placing the first and second panels on a die and joining the first and second panels with one or more rivets after the elevating step.

In an additional embodiment, a process for joining fiber composite materials using self-piercing rivets is disclosed. The process includes contacting first and second panels. The second panel is a fiber composite material. The process further includes elevating a temperature of a fastening portion of the second panel. The process also includes placing the first and second panels on a die and joining the first and second panels with one or more rivets while the fastening portion is at an elevated temperature.

BRIEF DESCRIPTION OF THE DRAWINGS

FIG. 3A is a cross-sectional view of a glass fiber composite material panel joined to an aluminum panel using a self-piercing riveting method;

FIG. 3B is a bottom view of the button of FIG. 3A;

FIG. 4A is a cross-sectional view of a carbon fiber composite material panel joined to an aluminum panel using a self-piercing riveting method;

FIG. 4B is a bottom view of the button of FIG. 4A;

DETAILED DESCRIPTION

Figure 1A:
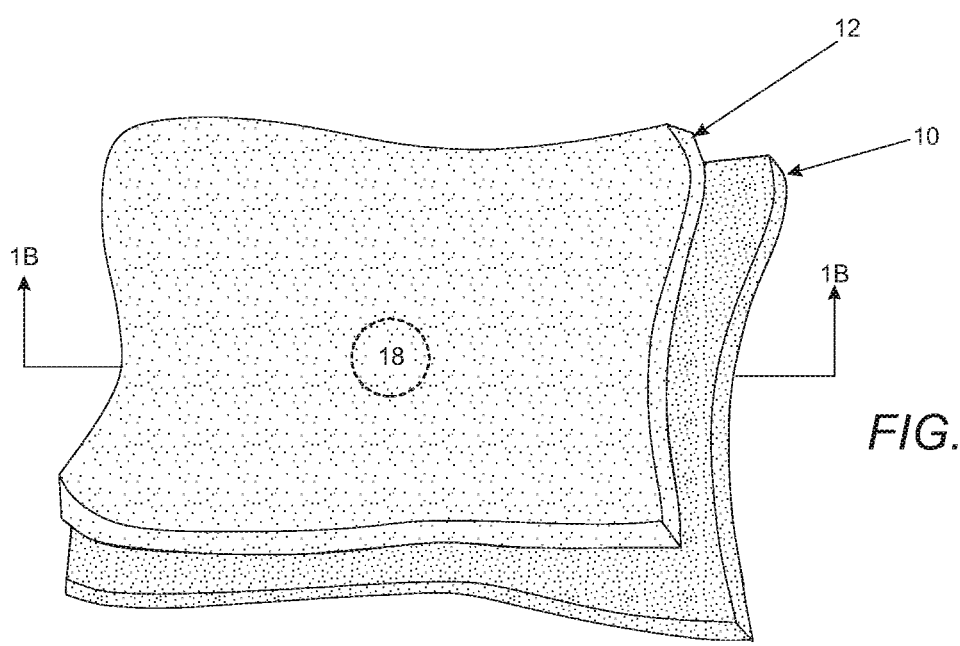
FIG. 1A is a fragmented, perspective view of bottom and top layers to be joined.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Accordingly, specific structural and functional details disclosed herein are not to be interpreted as limiting, but merely as a representative basis for teaching one skilled in the art to variously employ the present invention.

As the automotive industry strives to meet customer fuel economy expectations and Corporate Average Fuel Economy (CAFE) requirements, interest in alternative lightweight materials, including, without limitation, fiber composite materials, has increased. Joining methods for conventional steel structures have traditionally used resistance spot-welding. In the case of vehicles using aluminum and mixed metal joining applications, self-piercing rivet (SPR) technology has been utilized. One benefit of SPR technology is that it is capable of being implemented in high volume production assembly processes. Further, it is compatible with adhesive joining methods, and therefore, both methods can be used in conjunction. However, the challenge often faced with SPR technology is that the material of the panels being joined must be ductile enough to form an adequate button. The button is a result of creating the joint and providing suitable deformation to provide adequate mechanical interlock and a button with acceptable characteristics, e.g. the absence of unacceptable button cracking.

Composite materials, such as carbon fiber or glass fiber composite materials, have not been found suitable for certain joining processes and related materials. Certain of these composite materials often have limited ductility and are not susceptible to the large displacements and deformation required to produce an adequate SPR button. One problem is that the reinforcing fibers may break through the surface of the composite panel. Carbon or natural fiber reinforcing fibers may absorb moisture if they break through the surface of the composite panel. Fibers that absorb moisture can be objectionable because they may cause corrosion and may weaken the joints. Carbon fibers, when exposed to moisture, may cause galvanic corrosion when the fibers come into contact with metal parts or fasteners.

While adhesive joining processes have been used to join composite materials, the use of these processes results in a lower volume production method. Further, until the adhesive cures, the uncured joint is susceptible to displacement and/or movement between the parts or panels being joined. A joining solution which can be integrated into high volume production requirements is needed for joining low ductility fiber composite materials. One or more embodiments of the present invention relate to a method for joining fiber composite materials using SPRs that produces a button with superior shaping characteristics (and mechanical interlock).

In one or more embodiments, ductility refers to plasticity or the extent to which the material can be plastically deformed without fracture. While fiber composite materials have relatively low ductility, metals and metal alloys tend to have high ductility. In contrast, fibrous composite materials are typically non-ductile at ambient temperatures. In one or more embodiments, the present invention is directed to a process to improve the ductility of fiber composite materials prior to and/or during the self-piercing riveting joining process.

Composite materials may include carbon fiber and glass fiber composites, natural fibers, flakes, or particles, and combinations thereof. Composite materials can be produced with a variety of different fiber densities and formats. Non-limiting examples of composite material formats include randomly dispersed fibers or aligned fibers. Composite materials may have various matrix materials (otherwise referred to as surrounding materials), including without limitation thermoplastic polymers, such as polyamide or thermosets, such as epoxy.

Figure 1B:
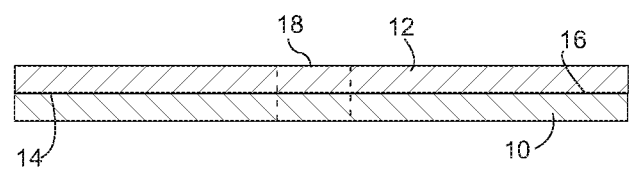
FIG. 1B is a cross-sectional view taken along the line 1B-1B of FIG. 1A.

FIG. 1A depicts a fragmented view of bottom layer and top layer 10 and 12 to be joined using SPRs. The bottom layer is adjacent to the die when set on the riveting machine, as described in more detail below. FIG. 1B is a cross-sectional view taken along the line 1B-1B of FIG. 1A and shows first contacting portion 14 of bottom layer 10 and second contacting portion 16 of top layer 12. Bottom layer 10 may be formed of a composite material. Top layer 12 may be formed of an aluminum alloy, steel, magnesium alloy. The bottom and top layers collectively define a fastening region 18 that later receives a fastener, such as, but not limited to an SPR.

A heater 20 may be used to elevate the temperature of a fastening region 18 to make the fastening region 18 ductile to reduce cracking and fractures upon joining the bottom and top layers 10 and 12. The first contacting portion 14 and second contacting portion 16 are joined while at least a portion of fastening portion 18 is at an elevated temperature. In one or more embodiments, heat is applied to the composite material local to the fastening region 18 and prior to joining the layers. In an alternative embodiment, both bottom and top layers 10 and 12 are formed of a fiber composite material.

The fiber composite material components can be heated to a temperature near the glass transition temperature of the composite material to achieve adequate ductility of the composite material. Once the composite material reaches a desired elevated temperature, layers 10 and 12 are joined through a process, such as riveting. The composite material may be heated before or after the layers 10 and 12 are contacted. It should be understood that the components to be fastened may include one or more fiber composite materials or may be a fiber composite material with one or other materials such as a metal. Metals, such as, but not limited to, aluminum alloys, steel or magnesium alloys, are used in sheet fabrication and fastened by SPRs, including, but not limited to pan heads and counter sunk rivets. The application of heat to fasten a non-ductile fiber composite component may be used for other joining methods including but not limited to flow-drill screwing and clinching, as increasing the ductility of the composite layer is advantageous for these fastening techniques, as well.

The heat may be applied by radiant, inductive or convective heat transfer while the components are on a conveyor or stationary. Radiant heat may be provided by a hot surface such as an electrically heated solid material or a light source. Convective heat transfer may be provided by a heat gun or hot gas blower, such as, blowers used in furnaces or hot-air impingement. The elevated temperature of the composite material to change the material to exhibit plastic or ductile behavior is dependent on the type of matrix or resin material and is related to its glass transition temperature. Epoxy materials may require up to 300° C. to achieve ductile behavior. For fiber composite materials, the temperature for ductile behavior may range from 25 to 300° C., and, in one embodiment, from 100 to 250° C. for carbon fiber reinforced composite materials. The heat source is selected to not pose a risk of damaging the composite material. In one embodiment, the composite component and the other component are contacted while the heat is being applied. To this end, high power laser heating would not be acceptable, as it may chemically and irreversibly degrade the constituents of the composite when under intense localized heating. Moreover, the focused beam of the laser may not heat the composite part over a sufficient area, as the thermal conductivity may be significantly lower than what is found in metals. Hence, heating via radiant (e.g., a near-infrared source) or convection heating is contemplated in one or more embodiments of the present invention.

Figure 2:
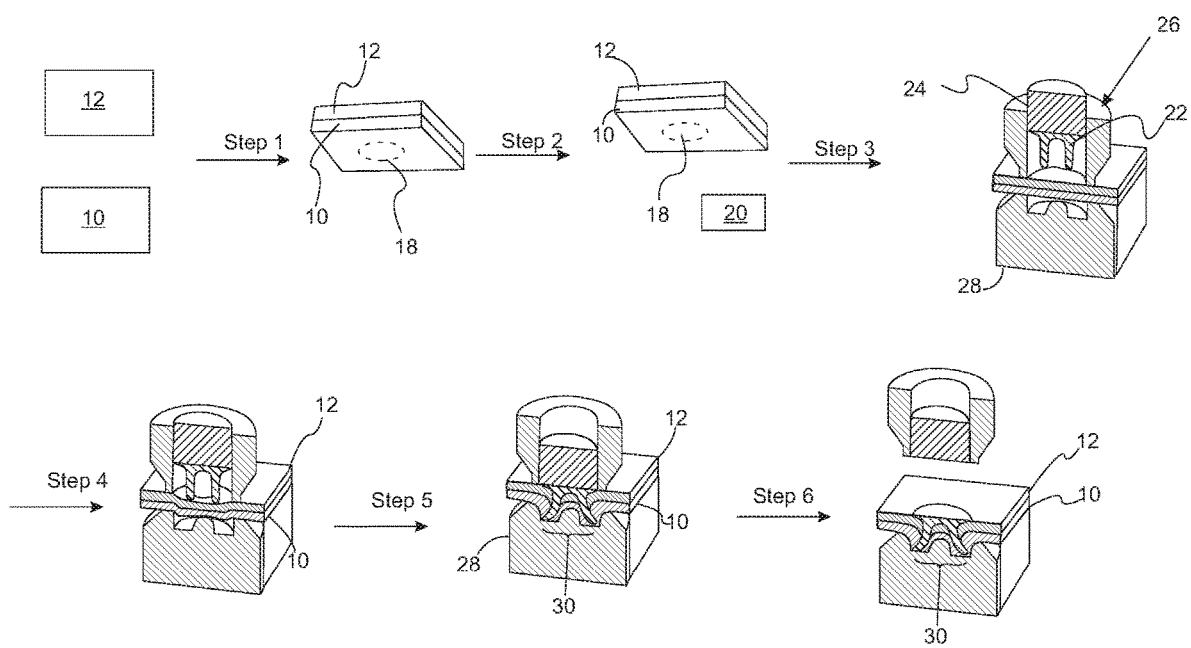
FIG. 2 is a schematic view of the steps of a process for joining fiber composite materials using self-piercing riveting.

Referring to FIG. 2, a schematic view of the steps according to one method embodiment of the present invention for self-piercing riveting of fiber composite materials is provided. Step 1 results in the placement of bottom layer 10 (e.g., fiber composite material) and top layer 12 (e.g., aluminum) so that they can be joined at the fastening region 18. Step 2 shows the application of heat from a heater 20 to elevate the temperature of at least a portion of the fastening region 18. The heat may be applied to either the bottom layer 10 at the first contacting portion 14 or the top layer 12 at the second contacting portion 16, or to both layers 10 and 12 of the first and second contacting portions 14 and 16, respectively. The heat may also be applied only to the external surfaces of layers 10 and/or 12 to avoid chemical or irreversible degradation of the layers.

The non-ductile components absorb heat to elevate the temperature in the fastening region 18. The heat may be radiant or conductive heat. The heat may be supplied from one or more heaters. Step 3 illustrates rivet 22, punch 24, blankholder 26 and die 28 that are placed about the fastening region 18 to be joined. In step 4, punch 24 is lowered and begins to deform layers 10 and 12. In step 5, rivet 22 is inserted, or pierced, into top layer 12 and the bottom layer 10 material deforms into die 28 and button 30 is formed. Step 6 shows button 30 and the joined layers 10 and 12.

FIG. 3A is a cross-sectional view of an aluminum panel 32 joined to a glass fiber composite panel 34 with an SPR 36. SPR 36 includes head 38 and shaft 40, which is deformed into an elliptical shape upon extending into panels 32 and 34. SPR 36 extends into both the glass fiber composite panel 34 and the aluminum panel 32. Shaft 40 extends into aluminum panel 32 an orthogonal horizontal distance from the intersection region 42 of the aluminum panel 32, glass fiber composite panel 34 and SPR 36. The distance $d_1$ on the left cross-section of shaft 40 is about 0.20 mm and the distance $d_2$ on the right cross-section of shaft 40 is about 0.19 mm. As shown, there is minimal variation in the distances $d_1$ and $d_2$. Joints formed with SPRs exhibiting sufficient interlock and showing this minimal variation form a strong and durable joint. Referring to FIG. 3B, a bottom view of button 44 of FIG. 3A is shown. The button 44 is smooth and free of cracks or paths for moisture permeation or egress and other flaws, which are further characteristics of a robust and durable joint.

FIG. 4A is a cross-sectional view of an aluminum component 48 joined to a carbon fiber composite material component 50 using an SPR technique at room temperature. SPR 52 includes head 54 and shaft 56. Void 58 is formed between SPR 52 and aluminum component 48. Void 58 is shown in FIG. 4a. The joint shows poor interlock with asymmetry of the SPR shaft 56. The orthogonal horizontal distance $d_1$ on the left cross-section of shaft 56 is about 0.17 mm and the distance $d_2$ on the right cross-section of shaft 56 is about 0.28 mm. As shown, there is a significant variation in the distances $d_1$ and $d_2$. Joints formed with SPRs showing this significant variation exhibit poor mechanical interlock that may form a weak joint, and moreover, may exhibit low process capability and repeatability.

Referring to FIG. 4B, a bottom view of button 60 from FIG. 4A is shown. Button 60 is fractured and shows cracks or paths for moisture egress thereby making the materials of the joint susceptible to corrosion or premature failure. The type of failure shown in FIGS. 4A and 4B are also not reproducible and therefore the early failure cannot be accommodated for by design. As shown in FIGS. 4A and 4B, the fractures and/or cracks 61 in button 60 penetrate such that a portion or region of the aluminum component 48 and SPR 52 are exposed. Such exposure makes aluminum component 48 and SPR 52 susceptible to corrosion and/or premature failure. This result exhibits unacceptable button cracking. While the asymmetrical interlock may be addressed by using a different rivet material, unacceptable button cracking cannot be addressed by using a different material. Rather, the hot riveting method of one or more embodiments satisfactorily provides a resulting joint with acceptable button properties, as described below in reference to FIGS. 5A and 5B.

Figures 5A, 5B:
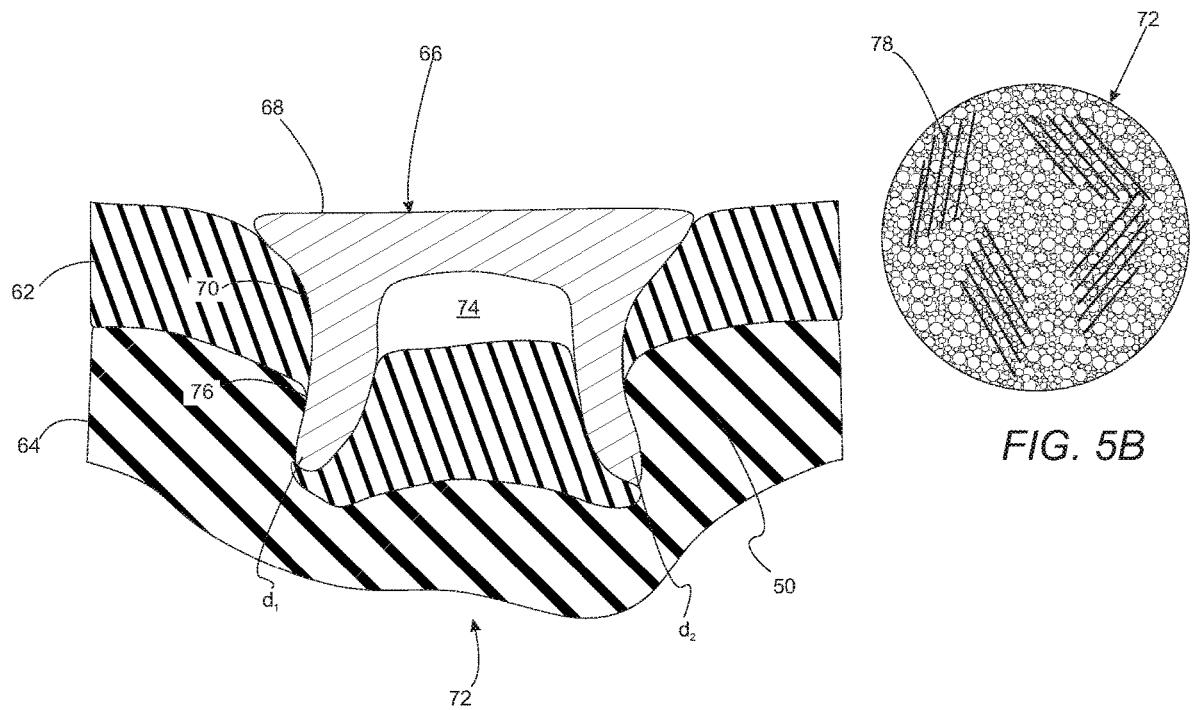
FIG. 5A is a cross-sectional view of a carbon fiber composite material panel joined to an aluminum panel using a self-piercing riveting method that includes the application of heat to the carbon fiber composite material.
FIG. 5B is a bottom view of the button of FIG. 5A.

FIG. 5A is a cross-sectional view of an aluminum component 62 joined to a carbon fiber composite material component 64 using an SPR technique at an elevated temperature. In the embodiment shown, the carbon fiber composite material component 64 was heated to a temperature of between 180 to 210° C. prior to joining it with the aluminum component 62. SPR 66 includes head 68 and shaft 70. Region 74 of the joint shown in FIG. 5A is a void between SPR 66 of aluminum component 62. SPR 66 extends into both the carbon fiber composite panel 64 and the aluminum panel 62. Shaft 70 extends into carbon fiber composite material component 64 an orthogonal horizontal distance from intersection region 76 of components 62 and 64 and SPR 66. Distance $d_1$ on the left cross-section of shaft 70 is about 0.19 mm and the distance $d_2$ on the right cross-section of shaft 70 is about 0.16 mm. As shown, there is minimal variation in the distance $d_1$ and $d_2$. Joints formed with SPRs exhibiting sufficient interlock and showing this minimal variation form a strong and durable joint. The enhanced ductility and material flow accomplished by heating carbon fiber composite material component 64 to an elevated temperature results in adequate interlock between components 62 and 64, symmetry of the shaft 70 and reduced cracking of the button 72 of FIGS. 5A and 5B. As shown in FIGS. 5A and 5B, the fractures and/or cracks 78 do not penetrate such that a portion or region of the aluminum component 62 or SPR 66 is exposed. Such unexposed surfaces reduce the susceptibility of aluminum component 62 or SPR 66 to corrosion or premature failure, and provide a repeatable and consistent solution to the unacceptable button cracking described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   contacting first and second panels, the second panel being a fiber composite material, the first panel having first and second surfaces, the second panel having first and second surfaces, the second surface of the first panel contacting the first surface of the second panel;
   while the first and second panels are contacting each other, elevating a temperature of a fastening portion of the second panel from a heat source spaced apart from the second panel, the second surface of the second panel positioned adjacent to the heat source; and
   while the fastening portion is at the elevated temperature and the first and second panels are contacting each other, placing the first and second panels on a die and joining the first and second panels with one or more rivets.

2. The method of claim 1, wherein the elevating step includes applying radiant heat from the heat source.

3. The method of claim 1, wherein the elevating step includes applying convective heat from the heat source.

4. The method of claim 1, wherein the fiber composite material includes a thermoset composite material.

5. The method of claim 4, wherein the thermoset composite material is an epoxy-based material.

6. The method of claim 1, wherein the fiber composite material is a carbon or glass fiber material including glass or carbon aligned fibers.

7. A method comprising:
   contacting first and second panels, the second panel being a fiber composite material, the first panel having first and second surfaces, the second panel having first and second surfaces, the second surface of the first panel contacting the first surface of the second panel;
   while the first and second panels are contacting each other, elevating a temperature of a fastening portion of the second panel from a heat source spaced apart from the second panel, the second surface of the second panel positioned adjacent to the heat source; and
   after the elevating step, placing the first and second panels on a die and joining the first and second panels with one or more rivets.

8. The method of claim 7, wherein the elevating step includes applying radiant heat from the heat source.

9. The method of claim 7, wherein the elevating step includes applying convective heat from the heat source.

10. The method of claim 7, wherein the fiber composite material includes a thermoset composite material.

11. The method of claim 10, wherein the thermoset composite material is an epoxy-based material.

12. The method of claim 7, wherein the placing step occurs while the fastening portion is at an elevated temperature.

13. The method of claim 7, wherein the fiber composite material is a carbon or glass fiber material including glass or carbon aligned fibers.

14. A method comprising:
contacting first and second panels, the second panel being a carbon or glass fiber composite material, the first panel having first and second surfaces, the second panel having first and second surfaces, the second surface of the first panel contacting the first surface of the second panel;
while the first and second panels are contacting each other, elevating a temperature of a fastening portion of the second panel from a heat source spaced apart from the second panel, the second surface of the second panel positioned adjacent to the heat source; and
while the fastening portion is at the elevated temperature and the first and second panels are contacted, placing the first and second panels on a die and joining the first and second panels with one or more rivets.

15. The method of claim 14, wherein the carbon or glass fiber composite material includes a carbon fiber material and a polymeric material.

16. The method of claim 14, wherein the carbon or glass fiber composite material includes a thermoset composite material.

17. The method of claim 14, wherein the elevating step includes applying radiant heat from the heat source.

18. The method of claim 14, wherein the elevating step includes applying convective heat from the heat source.

19. The method of claim 14, wherein the elevated temperature is ±30% of a glass transition temperature in Kelvin of the fiber composite material.

20. The method of claim 14, wherein the carbon or glass fiber composite material is a carbon or glass fiber material including glass or carbon aligned fibers.

* * * * *